United States Patent
Cogswell et al.

(10) Patent No.: US 9,325,971 B2
(45) Date of Patent: Apr. 26, 2016

(54) ENGINEERED POINT SPREAD FUNCTION FOR SIMULTANEOUS EXTENDED DEPTH OF FIELD AND 3D RANGING

(71) Applicant: The Regents of the University of Colorado, a body corporate, Denver, CO (US)

(72) Inventors: Carol J. Cogswell, Boulder, CO (US); Robert H. Cormack, Erie, CO (US); Ramzi N. Zahreddine, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 431 days.

(21) Appl. No.: 13/829,541

(22) Filed: Mar. 14, 2013

(65) Prior Publication Data

US 2014/0192166 A1 Jul. 10, 2014

Related U.S. Application Data

(60) Provisional application No. 61/751,021, filed on Jan. 10, 2013.

(51) Int. Cl.
*H04N 13/02* (2006.01)
*G06T 7/00* (2006.01)

(52) U.S. Cl.
CPC ............ *H04N 13/025* (2013.01); *G06T 7/0069* (2013.01); *H04N 13/0271* (2013.01); *G06T 2200/21* (2013.01); *G06T 2207/10052* (2013.01)

(58) Field of Classification Search
CPC ............ H04N 13/025; H04N 13/0271; H04N 13/0275; H04N 13/0203; G06T 7/0069; G06T 5/003; G06T 2200/21; G06T 2207/10052; G06T 2207/10057; G06T 7/0065; G02B 13/18; G02B 27/0075; G02B 13/20
USPC ...................... 348/48, 350, 79, 241; 382/255
See application file for complete search history.

(56) References Cited

U.S. PATENT DOCUMENTS 3,708,619 A * 1/1973 Martin ......................... 348/349
5,521,695 A 5/1996 Cathey, Jr. et al.
(Continued)

OTHER PUBLICATIONS

Zahreddine et al., "Reducing noise in extended depth of field microscope images by optical manipulation of the point spread function," Proc. of SPIE vol. 7904, 2011, pp. E1-E7.

*Primary Examiner* — David Harvey
(74) *Attorney, Agent, or Firm* — Jennifer L. Bales; Macheledt Bales LLP (57) ABSTRACT

Optical systems utilize waveplates to simultaneously encode information for increasing image depth of field and for providing a depth map of the imaged object or sample. These waveplates are configured to result in a focus-invariant point spread function in one focal region, and to result in point spread functions that vary as a function of range within the imaged object in a different focal region. For example, a basic compound microscope might have a specially shaped waveplate inserted at the back aperture plane of the microscope objective to manipulate the phase of the wavefront. An image formed on one side of the plane of best focus is focus invariant, and is brought into focus by a restoring algorithm. An image formed on the other side of the plane of best focus captures point spread functions comprising rings that vary with depth within the imaged object.

23 Claims, 8 Drawing Sheets

(56) References Cited

U.S. PATENT DOCUMENTS

| | | | |
|---|---|---|---|
| 5,748,371 A | 5/1998 | Cathey, Jr. et al. | |
| 6,021,005 A | 2/2000 | Cathey, Jr. et al. | |
| 6,069,738 A | 5/2000 | Cathey, Jr. et al. | |
| 6,417,950 B1 | 7/2002 | Cathey, Jr. | |
| 7,139,067 B2 | 11/2006 | Pohle et al. | |
| 7,705,970 B2 | 4/2010 | Piestun et al. | |
| 8,340,456 B1* | 12/2012 | DaneshPanah et al. | 382/255 |
| 2005/0204329 A1* | 9/2005 | Pauca | G06T 5/003 716/55 |
| 2009/0040602 A1* | 2/2009 | Spilman et al. | 359/386 |
| 2010/0073518 A1* | 3/2010 | Yeh | H04N 5/217 348/231.99 |
| 2010/0208275 A1* | 8/2010 | Babayoff | 356/610 |
| 2010/0215219 A1* | 8/2010 | Chang et al. | 382/106 |
| 2010/0226011 A1* | 9/2010 | Szapiel | G02B 13/146 359/558 |
| 2010/0295973 A1* | 11/2010 | Aubuchon | G02B 13/20 348/241 |
| 2011/0043661 A1* | 2/2011 | Podoleanu | 348/239 |
| 2011/0267508 A1* | 11/2011 | Kane | G06T 7/0069 348/241 |
| 2013/0107002 A1* | 5/2013 | Kikuchi | H04N 5/232 348/46 |
| 2013/0194458 A1* | 8/2013 | Nayar | G06T 5/003 348/241 |
| 2014/0008549 A1 | 1/2014 | Theriault et al. | |
| 2014/0192166 A1* | 7/2014 | Cogswell et al. | 348/49 |
| 2014/0252200 A1* | 9/2014 | Garsha | G02B 21/367 250/201.3 |
| 2015/0077589 A1* | 3/2015 | Hayashi | G02B 27/0025 348/231.6 |

\* cited by examiner

ENGINEERED POINT SPREAD FUNCTION FOR SIMULTANEOUS EXTENDED DEPTH OF FIELD AND 3D RANGING

BACKGROUND OF THE INVENTION

1. Field of the Invention

The present invention relates to imaging that accomplishes extended depth of field and 3D ranging simultaneously. In particular, the present invention accomplishes such ranging utilizing an engineered point spread function and forming dual images for processing.

2. Discussion of Related Art

Breakthroughs in optoelectronic technologies over the past few decades have led to an explosion of new microscope configurations for addressing specific biological problems. However, these microscopes still have significant shortcomings that, if overcome, could provide biologists with the ability to conduct a greater range of live-cell imaging investigations. Specifically, the ability to create images of sharply focused fine structure throughout the entire 3D cell volume at video rates or faster is still needed. Also needed is a way to reduce the ubiquitous noise common to low light imaging applications, such as in live-cell fluorescence studies, even when using the best available cameras and sensors. A final need is to make microscope systems that are less complicated, less costly and therefore accessible to many more biologists, without compromising the high performance capabilities provided by these modern high-end instruments. Our proposed new microscope will therefore aim to provide significant advancements toward addressing these needs.

Limitations of existing microscopes: For over 400 years, the compound optical microscope has been a primary tool for imaging the world of living systems. Although improvements in the past few decades have generated many new capabilities (e.g. confocal, multi-photon, widefield deconvolution, specific fluorescence techniques such as FLIM, STORM, PALM, to name a few) the underlying optical principles governing the design of objective lenses used by all of these microscope systems have remained unchanged. These design principles are directed toward producing the best possible lateral resolution in each recorded image through maximizing objective numerical aperture (NA) and correcting all common optical aberrations. Strict adherence to these design criteria results in well-known tradeoffs or compromises in objective lens performance, specifically: (1) increasing lateral resolution (i.e. increasing NA) causes a rapid decrease in image depth of field so that many features inside thick objects may appear blurred if they fall above or below the plane of best focus, and (2) each single image is a two-dimensional (2D) projection in which the 3D positions of biological features inside the specimen volume are lost.

Confocal and widefield deconvolution microscopes overcome these two tradeoffs by moving the plane of best focus up and down throughout the specimen volume to acquire a stack of "best focused" images for further processing. However, this process is slow, usually requiring a minimum of 1-2 seconds to acquire each image stack which can lead to increased fluorophore bleaching as well as motion blur of fast moving cell features. Other schemes, such as multi-focal plane illumination designs that try to speed up the depth scanning process, introduce the possibility of alignment errors and require expensive optoelectronics.

A technique called wavefront coding has been used in an attempt to increase depth of field of images in optical microscope systems. A waveplate (for example as taught in U.S. Pat. No. 5,748,371) in the optical path creates image point spread functions with increased depth of focus. However, the wavefront coding approach was so severely limited by noise and image reconstruction artifacts that it proved to be an unviable option for high-resolution, extended depth of field (EDF) biological microscopy.

A further limitation of these microscopes is that the only way they address the problem of reducing image noise is by using very expensive, low-noise detectors such as EMCCD or CMOS cameras, or photomultiplier tubes in the case of confocal point scanning systems. A need remains for the reduction or elimination of image noise artifacts. These usually appear as randomly scattered bright image pixels arising from detector electronics and shot noise, and are particularly problematic in light starved applications such as when observing weakly fluorescing live-cell structures. In these situations, detector noise of various types can be so prevalent as to mask the tiny features of biological interest when imaging near the resolution limit of the microscope.

A need remains in the art for an imaging system that simultaneously increases depth of field and encodes 3D ranging information, while reducing image noise.

SUMMARY OF THE INVENTION

It is an object of the present invention to image a specimen with an extended depth of field, and simultaneously record 3D range information about the same specimen, while reducing the effects of image noise.

An embodiment of the present invention is a new microscope utilizing a new class of waveplates that, when inserted in the back aperture of the microscope objective, produce an extended depth of field in an image taken on one side of the nominal best focus, and simultaneously produce an image on the other side of best focus where objects are encoded with PSFs which uniquely determine the range (distance from best focus) of each object.

The new microscope splits the optical path in two parts, each sent to separate detectors, one of which records the image before the best focus plane and the other behind the best focus plane. Each detector records the same specimen volume, but are situated such that the given specimen volume is out of focus in one direction for one detector and out of focus the other way for the other detector.

The extended depth of field image has a PSF which is blurred, but the blur is constant over the depth of field. In the same manner as previous EDF systems (Cathey, W. T. and Dowski, E. R., U.S. Pat. No. 5,748,371), the unblurred in-focus image can be recovered with a digital filtering operation.

The range-encoded image has PSFs which change over the depth of field in precisely quantifiable ways. Depending on the design of the waveplate, the depth of each point in this image can be determined using a variety of classification algorithms.

By combining the information in each of the two images, a 3D representation of the specimen volume can be constructed.

The inventors have called the new design approach "expanded point information content" (EPIC) microscopy.

An embodiment of the present invention returns to the basic compound microscope design and simply manipulates the wavefront of the imaging beam as it exits the microscope objective to increase its information content. This is accomplished by inserting a custom designed optical element, called a waveplate, into a slot in the microscope objective lens turret (such as one designed to hold a DIC prism slider). The novel waveplate design modifies the wavefront to create a PSF that is slightly blurred, and focus invariant over an extended depth. The blur introduced by the waveplate is then removed by a single, digital filtering algorithm to restore fine detail to all image features within the focus invariant PSF region. This embodiment extends the DOF of a high NA objective lens by up to 10-12 times so that all features throughout the cell volume appear sharply focused in a single recorded image. By simultaneously recording a different focal region of the wavefront modified by the same waveplate, the invention acquires a highly accurate depth map that provides the ability to locate specimen features to within 75 nm or better. Thus, after batch processing the image pairs, full 3D animations can be displayed of live cell processes that were recorded at speeds more than an order of magnitude faster than are possible with any existing commercial biological microscope (e.g. at 10-20 ms per 3D image time point instead of 1-2 sec per multi-focal image stack). This batch processing may be accomplished, for example, using a linear deconvolving digital filter or a nonlinear neural network algorithm.

A method of imaging a three-dimensional (3D) object that simultaneously accomplishes extended depth of field and 3D ranging comprises the steps of providing an optical system including a waveplate constructed and arranged to modify light from a 3D object such that optical system simultaneously produces an extended depth of field (EDF) image of the object and produces a depth-encoded image of the object having a point spread function (PSF) which varies according to range, passing light from the 3D object through the optical system, detecting the EDF image with a first detector and detecting the depth-encoded image with a second detector spaced apart from the first detector, digitally filtering the detected EDF image, producing a depth map from the detected encoded image, and combining the filtered image and the depth map to form a 3D representation of the 3D object.

The step of detecting the EDF image is performed on one side of a best focus plane of the optical system and the step of detecting the depth-encoded image is performed on the other side of the best focus plane. The waveplate causes a discontinuity in the optical system point spread function (PSF) in the vicinity of the best focus.

The EDF image results in a modulation transfer function having no zeroes over a desired depth of focus. The EDF image is generally deconvolved, and noise is removed.

A nonlinear neural network may be used to deconvolve and denoise the image. Other noise removal techniques include performing a pattern classification algorithm and separating the signal from the noise based on the pattern classification step; and performing a least squares fit of point sources to a two-dimensional Gaussian function.

A circular caustic waveplate may be used to enable these techniques.

The waveplate is constructed and arranged to modify the optical path of light from a 3D object so as to enable the optical system to simultaneously produce two spaced apart images: an extended depth of field (EDF) image of the object; and a depth-encoded image of the object having a point spread function (PSF) which varies predictably according to range. The waveplate may comprise a transmissive or reflective object and may modify the path of the light using material thickness, index of refraction, surface shape, or some combination of these.

Apparatus for generating a 3D image of a 3D object according to the present invention comprises a first detector and a second detector and an optical system including a waveplate disposed between the 3D object and the detectors. The waveplate is constructed and arranged such that the optical system simultaneously produces an extended depth of field image at the first detector and a depth-encoded image at the second detector. The depth-encoded image exhibits a PSF which maps depth location to various points within the 3D object.

A processor filters the EDF image, forms a depth map from the depth-encoded image, and combines the filtered image and the depth map to form a 3D representation of the 3D object. The processor may include a multiple layer, shift invariant neural network for nonlinearly deconvolving the EDF image.

A microscope according to the present invention includes an objective for focusing light from the 3D object at the waveplate, and a beamsplitter for separating the EDF image and the depth-encoded image such that the EDF image forms on one side of a plane of best focus of the objective and the depth-encoded image forms on the other side of the plane of best focus of the objective.

An embodiment of the present invention generalizes the use of similar waveplates in other optical imaging devices, including but not limited to cameras and telescopes, by placing the waveplate near or conjugate to the back aperture of the imaging lens.

DETAILED DESCRIPTION OF THE INVENTION

Figure 1:
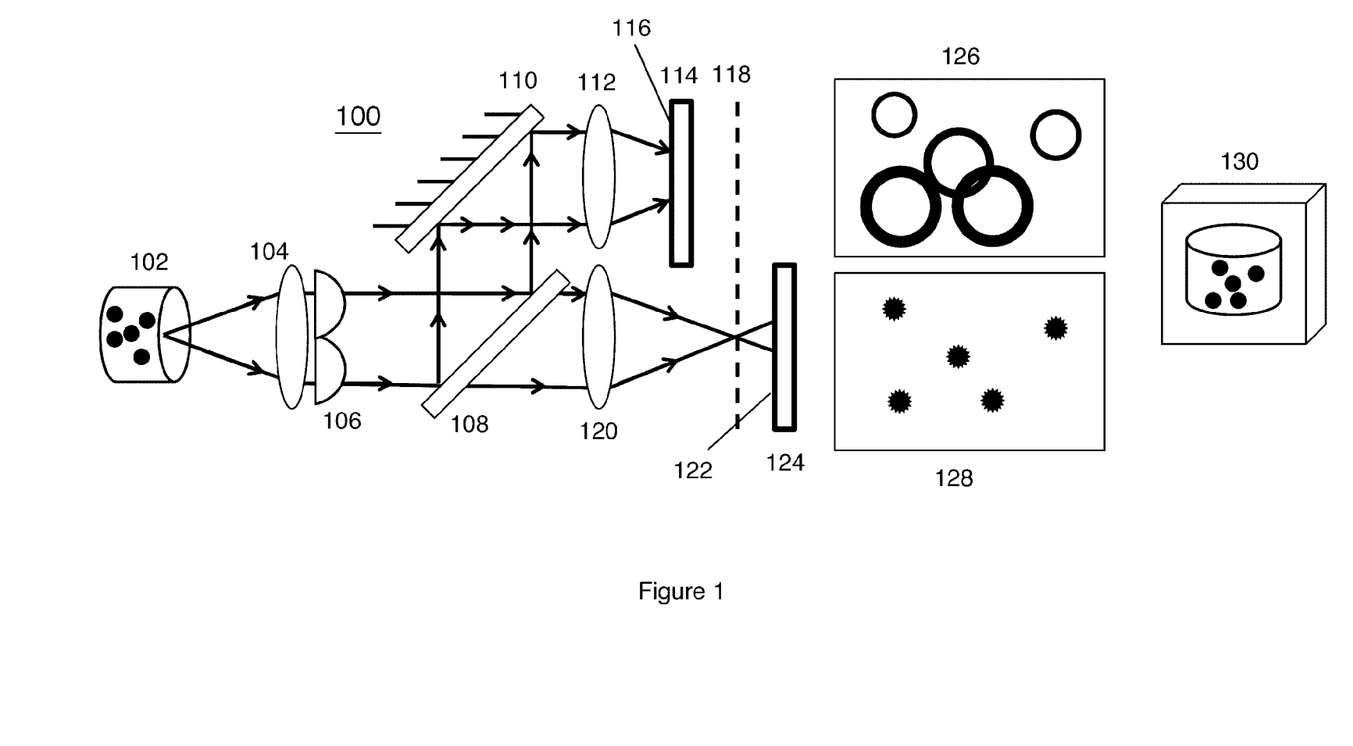
FIG. 1 is a schematic block diagram illustrating apparatus accomplishing extended depth of field and ranging according to the present invention.

FIG. 1 is a schematic block diagram illustrating apparatus 100 accomplishing extended depth of field and ranging according to the present invention. Apparatus 100 might be a basic compound microscope design, with two additions: waveplate 106 and a beam-splitter 108/mirror 110 combination for forming two images 126, 128 at planes 116 and 122.

Figure 3A:
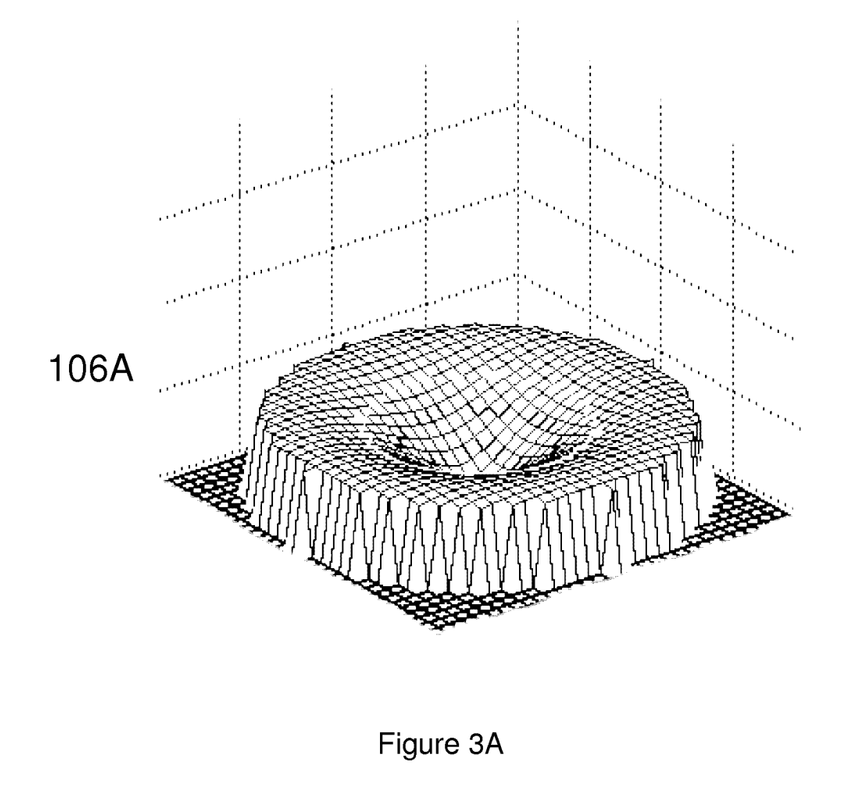
FIG. 3A is a plot illustrating the profile of a first embodiment of an "expanded point information content" (EPIC) waveplate according to the present invention.
Figure 3B:
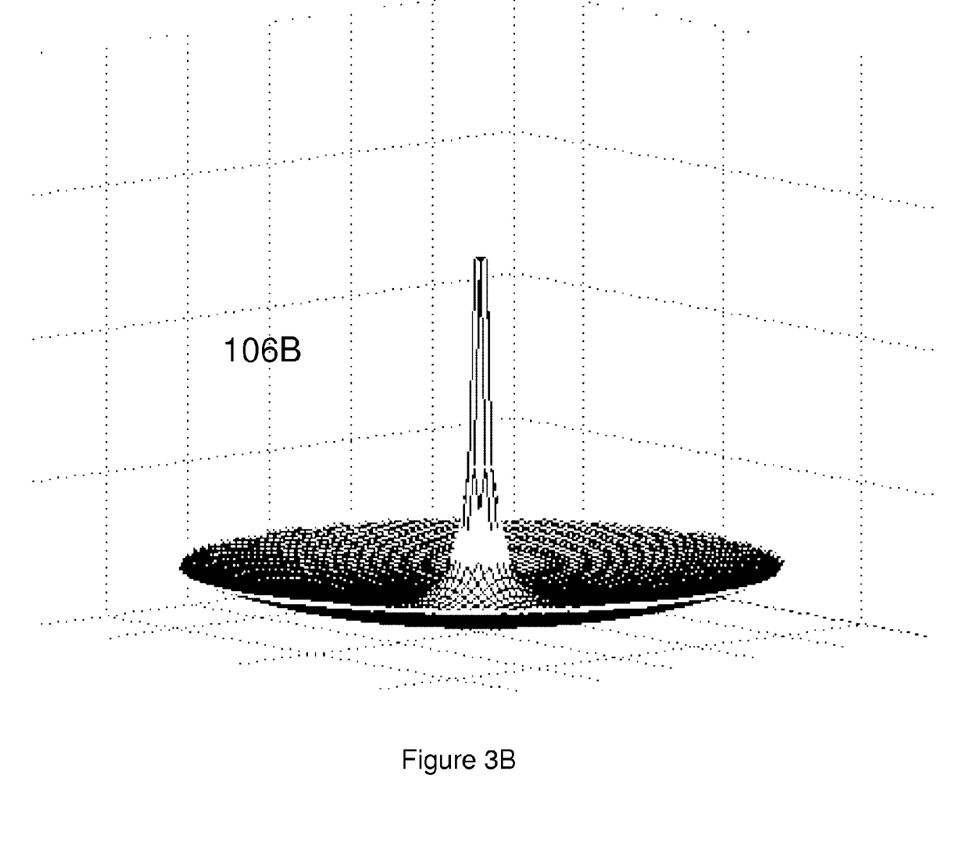
FIG. 3B is a plot illustrating the profile of a second embodiment of an EPIC waveplate according to the present invention.

Object 102 might comprise a sample containing elements at various depths. It is shown here as several points, for clarity in the following explanations. Light from object 102 is passed through lens 104 and waveplate 106. Waveplate 106 is located (for example) at the back aperture plane of the microscope objective, and causes the image to have a relatively focus invariant point spread function on one side of a plane of best focus, while causing the point spread function shapes to vary with range on the other side of the plane of best focus (for example, points might generate rings whose circumferences vary as a function of range or depth within object 102). Waveplate 106 might be as shown in FIG. 3A or 3B for example.

Next, beam splitter 108 and mirror 110 separate the beam so two images, 126 and 128 are formed via lenses 112 and 120. Image 126 will be used for 3D ranging and is formed at a first plane 116, in this embodiment before the plane of best focus, 118. Image 128 is formed at plane 122, in this embodiment beyond the plane of best focus, 118. Image 126 is captured by detector 114 and image 128 is captured by detector 124. Detectors 114 and 124 might be, for example, CCD cameras (e.g. a Hamamatsu dual-detector camera). Image 126 is used to generate a depth map of object 102, and image 128 will be used to form an in-focus image.

Figure 2:
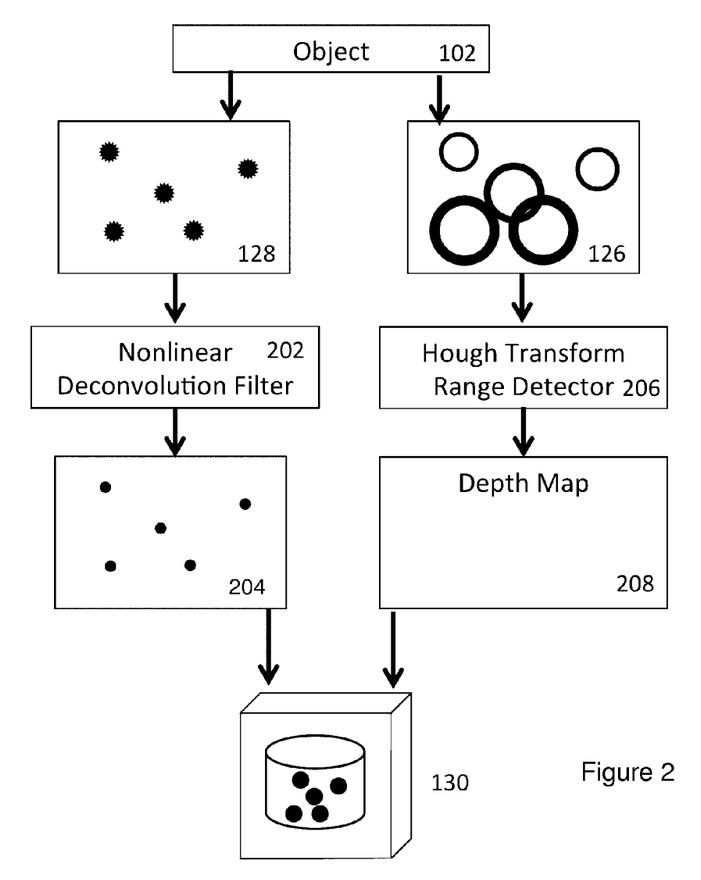
FIG. 2 is a flow diagram illustrating a method of extending depth of field and ranging according to the present invention.

FIG. 2 is a flow diagram illustrating a method of extending depth of field and ranging according to the present invention. Object 102 is imaged by device 100 as shown in FIG. 1 to form EDF image 128 and depth map image 126.

Image 128 shows fuzzy dots to indicate that the point-spread function of the image is slightly fuzzy, but relatively invariant for each of the imaged elements, even though they are at various depths within the sample. An image processing algorithm 202 (such as a non-linear deconvolution filter) is applied to remove the blurring pattern, resulting in a high-resolution, extended-depth image 204.

Figure 5:
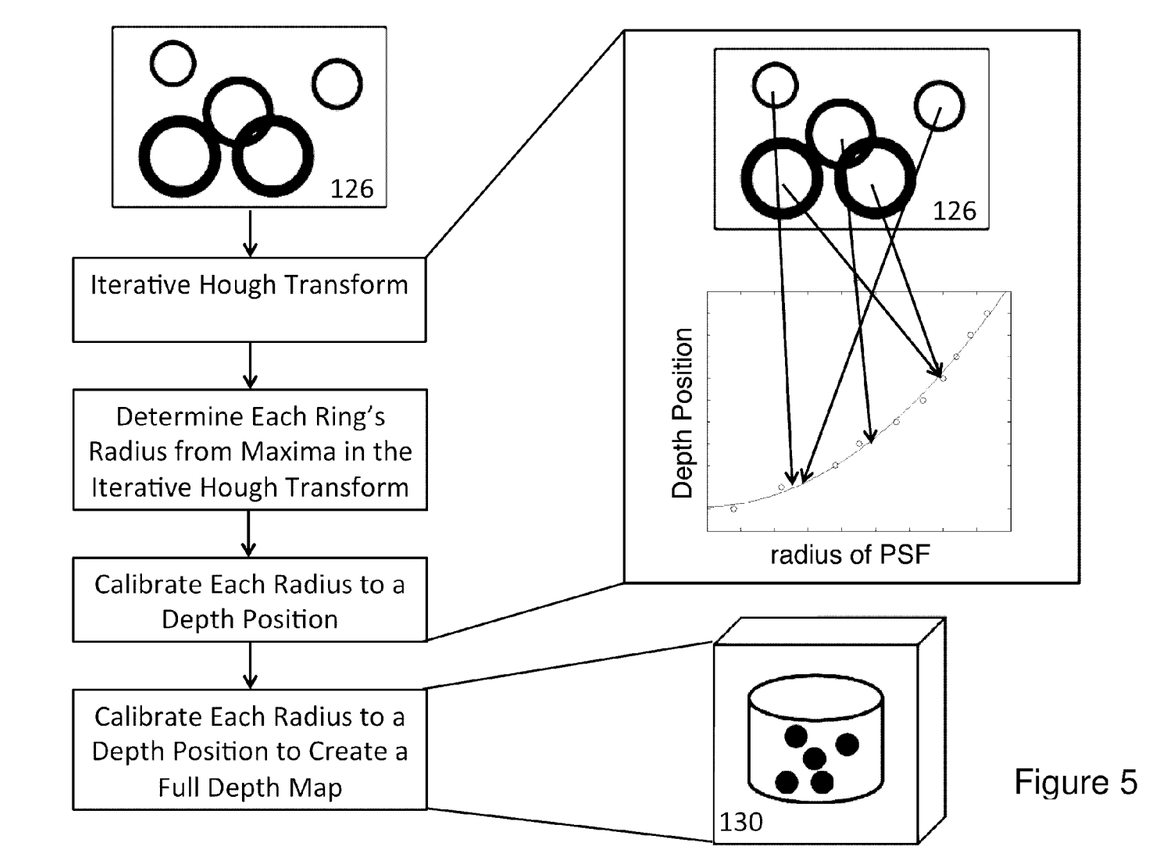
FIG. 5 is a schematic diagram illustrating ranging according to the present invention.

Image 126 shows a series of circles which indicate the depth of each element in object 102. A Hough Transform range-detecting algorithm (for example) may be used to find a range for each object, as shown in FIG. 5. This results in a depth map 208. Extended depth of field image 204 and depth map 208 are generally combined to generate a three-dimensional representation 130 of three-dimensional object 102 (such as a three-dimensional image).

FIG. 3A is a plot illustrating the profile of a first embodiment of an EPIC waveplate according to the present invention (not to scale). This shape is designated a circular caustic shape, and it creates an asymmetric point spread function such that the new information can be extracted by observing both sides of a best focus plane simultaneously (as shown in FIG. 1).

The waveplate of FIG. 3A exhibits focus-invariant PSFs only along one side of best focus. On the opposite side of focus, the PSFs form ring patterns, whose diameters are precisely correlated to the depth positions of object elements to an accuracy of 75 nm. Combining the information from these two images (using algorithms such as those shown in FIGS. 2, 4, and 5) allows 3D volume rendering to be employed to visualize biological features at highest resolution and with very low noise. These images can be recorded using the highest camera frame rates, and the algorithms can provide processed images in near real time.

FIG. 3A diagrams a first embodiment of a circular caustic waveplate 106A, one of a family of waveplate shapes that produce "expanded point information content" (EPIC) point spread functions. Typical dimensions for an optical microscope application are a waveplate of radius 5 mm and a peak to valley depth of 6 to 7 μm (note that this diagram is not to scale, but rather has the depth exaggerated for clarity). This corresponds to a maximum of 12-14 waves of phase delay using light of 500 nm wavelength. A typical material for fabricating these waveplates is PMMA. They can also be made out of optical quality glass. Note that this is a diagram of only the waveplate surface shape. In practice it is mounted on an optically flat base. As an alternative, waveplate 106 can be formed as a deformable mirror or an array of reflective elements shaped to produce the same phase modifications upon reflection as a transmissive waveplate would produce using variations in thickness or index. Often a transmissive waveplate is formed as part of another optical element, for example as thickness modifications on a lens surface.

FIG. 3B is a plot illustrating the profile of a second embodiment 106B of an EPIC waveplate according to the present invention, from the same family of waveplate shapes as that shown in FIG. 3A. Waveplate 106 is an inverted version of the circular caustic 106A. Circular caustics and inverted versions of circular caustics are collectively called "circular caustics" herein.

While waveplates 106A and 106B are shown as affecting optical path by varying the thickness of the waveplate material, varying index of refraction or surface shape (for a reflective waveplate) or some combination of these is equivalent.

Equations for One Embodiment of the Waveplate $P(r)$ is the amount of phase delay in the mask at a given radial position. Two functional embodiments of the phase mask are provided below. Both equations describe the same phase shape and delay.

Radial Polynomial Equation for: $0 \leq r < 5.07$ mm $$P(r)=0.03101*(r/5.07)^1-0.0236*(r/5.07)^2+0.01260*(r/5.07)^3-0.00443*(r/5.07)^4-0.0068*(r/5.07)^5+0.00843*(r/5.07)^6-0.00437(r/5.07)^7$$

Sinusoidal Equation for: $0 \leq r < 5.07$ mm $$P(r)=0.0066*\sin(r/2.73)$$

Figure 4:
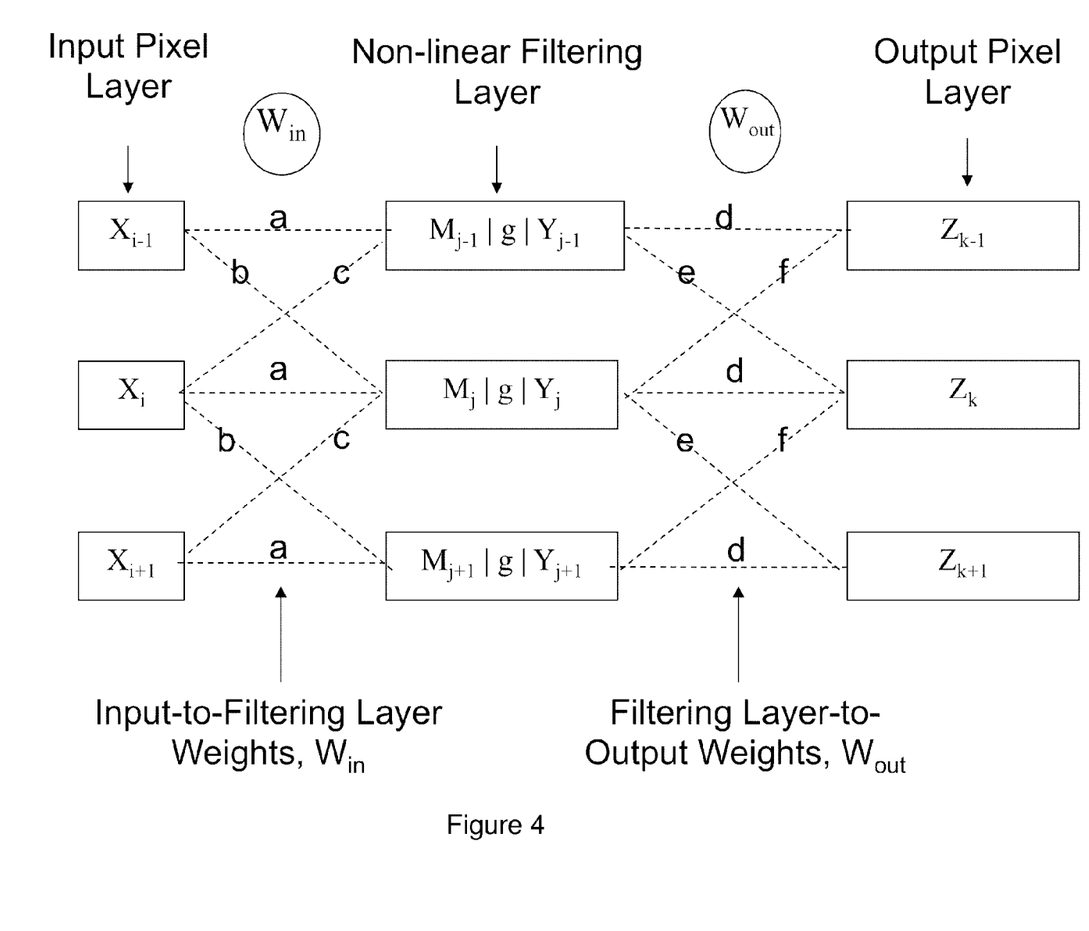
FIG. 4 is a schematic diagram illustrating an example of a nonlinear deconvolving algorithm for generating an in-focus, extended depth of field image according to the present invention.

FIG. 4 is a schematic diagram illustrating an example of a nonlinear deconvolving restoring algorithm for generating an in-focus, extended depth of field image according to the present invention. Linear techniques, such as a Weiner filter may also be used for the restoring algorithm, but nonlinear algorithms generally perform better in reducing noise and ringing effects.

This embodiment comprises a three layer, shift invariant, neural network. The nonlinear filter was iteratively trained to filter the modified PSF and null out the noise by the neural network using test images. Once trained, the resulting filter is applied to images in milliseconds via a look up table. This simplified example shows pixels from an input image, $X_i$, as they are weighted, summed, and operated on to create the nonlinearly filtered pixels of the output image, $Z_k$. The entire input image, X, is convolved with the input 2D weighting array, $W_{in}$, where the elements of the array are represented by lower case letters (a, b, c, etc.). The weighted input image pixels, $M_j$, are then operated on by a sigmoidal activation function, g(*). The output of the activation function, Y, is then convolved with the output 2D weighting array, $W_{out}$, where the elements of the array are represented by the lower case letters (e, d, f, etc.). This generates the final nonlinearly filtered image, Z.

The activation function, g(*), has a sigmoid shape, has a minimum value of 0, a maximum value of 1, and lies on the interval [0,1]. The functional form is shown in Eq. (3):

$$Y_j=g(M_j)=1/(1+e^{-2r(M_j-c)})$$

where $M_j$ represents a given pixel entering the second layer of the neural network, r determines the steepness of the transition, c sets the center point of the transition, and $Y_j$ represents a given output pixel of the second layer of the neural network. It has been shown that a three layer neural network structured using this general framework has the ability to approximate any nonlinear function. Thus, this filtering scheme has the capability to reconstruct high-resolution EDF images despite large amounts of background noise.

FIG. 5 is a schematic diagram illustrating ranging according to the present invention. This embodiment utilizes the conventional Hough Transform range detector. FIG. 5 shows results of a proof-of-concept circular Hough transform (HT) depth location algorithm 206 using images 126 of 100 nm fluorescent beads. The HT determines the precise radius of each ring PSF through an iterative search process that converges to a bright point when the correct circle radius is identified. This figure shows how the ring radii can be correlated with a calibration curve to localize each bead's position in z. Step 208 generates a depth map. Other ranging algorithms may be used.

Figure 6:
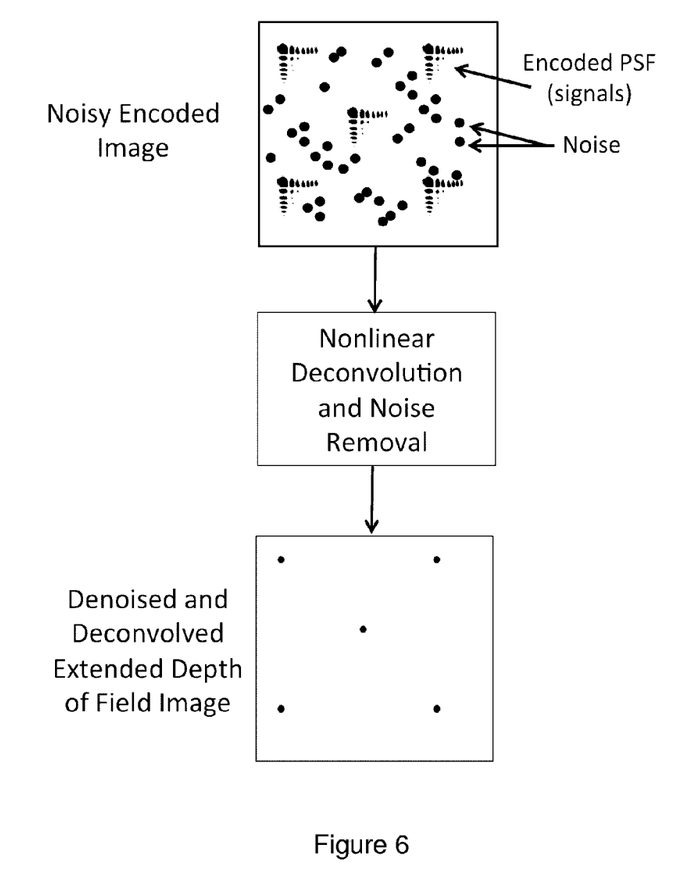
FIG. 6 is a schematic diagram illustrating noise removal and deconvolution according to the present invention.

FIG. 6 is a schematic diagram illustrating noise removal and deconvolution according to the present invention. Noisy encoded image 128 includes encoded information, here point sources encoded into a corner-like pattern 602, and noise 604. Processing step 202 recognizes information because of its characteristic pattern and removes noise (which does not have the characteristic pattern). Then processing step 202 deconvolves the encoded information, resulting in in-focus points as shown in denoised and deconvolved EDF image 204.

Additional noise removal processing is enabled by the fact that, in the EDF image, the objects contributing to the signal exhibit the same transverse intensity profile. This profile can be separated from noise, as shown in FIG. 6: the noise is simply random speckles, while points in the object form a distinct corner-like pattern. As long as the object consists of point like objects that sparsely populate the field of view (e.g. a scene of fluorescently tagged sub-cellular features that don't significantly overlap) a pattern classification algorithm can be used to identify the location of each object. The intensity profile for each identified object can then be subtracted from the original, and stored in a new image. This creates two images: a signal image with the pixel level location and intensity profile of each object, and a residual image comprised only of noise (which is then discarded).

In one example process, a modified version of the CLEAN algorithm from astronomy is used. The steps of such an example process are as follows:
1. Correlation to locate emitters (point-like objects)—Take a template PSF and perform a 2D auto-correlation with the noisy EDF encoded image. Maxima in the correlation image correspond to the central position of emitters.
2. Denoising—Subtract a template PSF from the noisy EDF image at the position of the maxima with the highest intensity value from the correlation image. The subtracted PSF is stored at the same x-y position in a new image. This identifies and removes the brightest emitter from the noisy EDF image.
3. The process is then repeated with the residual image, and the next brightest emitter is subtracted. The algorithm iterates until one of the following termination criterion is met: maximum number of iterations or the emitter intensity drops below a specified threshold value.

Taking the example of a microscope, in a traditional microscope, out of focus blur from the limited depth of focus makes it impossible to classify the signal. In the EDF image, the patterned signal can be classified and separated from the noise.

Another example of noise removal applies the concept of super location. Again this process exploits the fact that waveplate 106 creates an image signal that is identically patterned in x, y and z and uses this pattern to localize sparse, point like object features to a sub-pixel degree of precision. This technique again makes the assumption that the point-like objects are sparse in the field of view.

One specific example relies on the fact that the EDF PSF created by the circular caustic waveplate largely resembles that of a 2D Gaussian bell curve. The position of the point like objects can be found by performing a least squares fit of each object's PSF to a 2D Gaussian curve or a similar curve. The correlation step from the previous algorithm can be used to identify the 'coarse' position of each object. The least squares fit can then be performed to determine the 'fine' position of each object that was identified. The super localized objects are then plotted on a new grid to a sub-pixel resolution. Normally, out of focus blur limits the accuracy of a least-squares fit and adds ambiguity to the image. The EDF image removes that ambiguity.

Figure 7A:
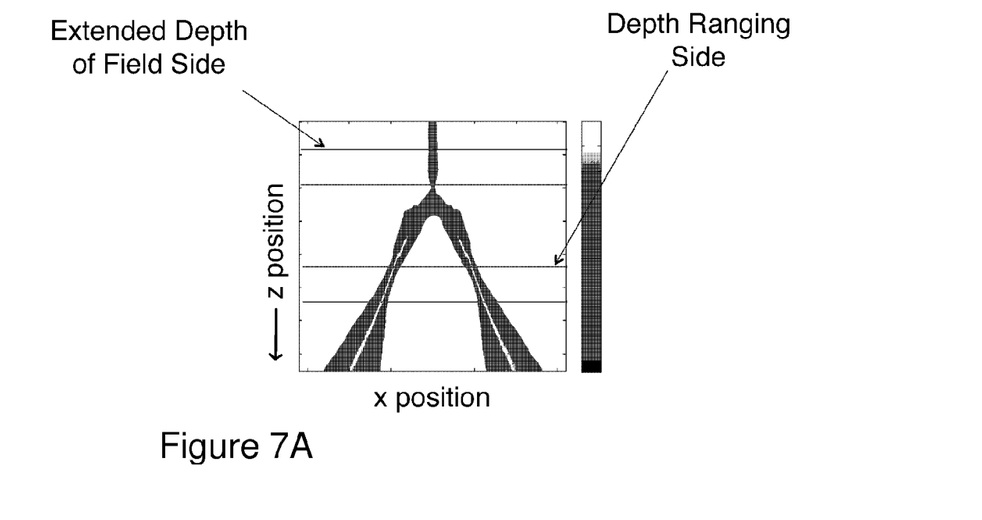
FIG. 7A is a diagram illustrating an X-Z slice of the through focus PSF created by the circular caustic waveplate of FIG. 3A or 3B.

FIG. 7A is a diagram illustrating an X-Z slice of the through focus PSF created by the circular caustic waveplate 106A of FIG. 3A or 106B of FIG. 3B. Lighter shades indicate greater intensity.

Figure 7B:
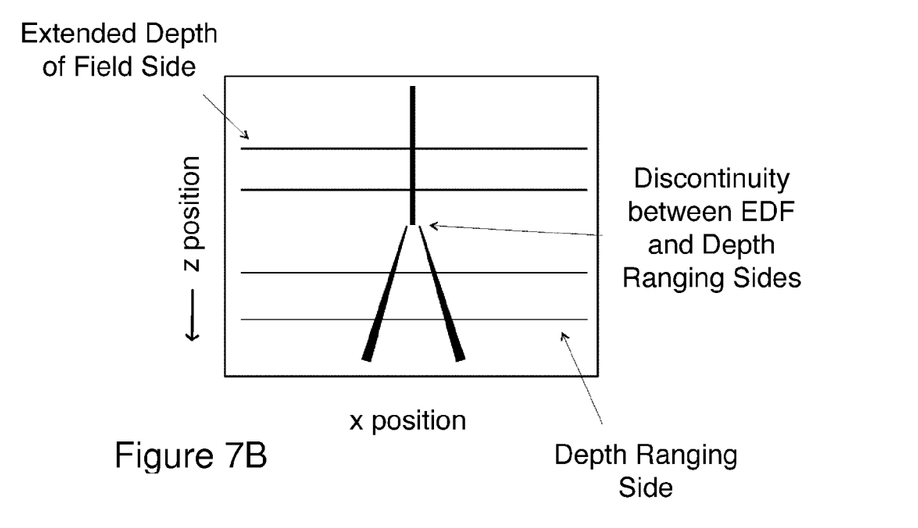
FIG. 7B is a simplified diagram illustrating the discontinuity in the PSF.

FIG. 7B is a simplified diagram illustrating the discontinuity in the PSF. While waveplates 106A and 106B are symmetrical, the resulting optical system PSF is not. FIG. 7B shows the point of discontinuity, for example in the vicinity of the plane of best focus of the optical system. On the extended depth of field side of the diagram, the PSF is near-invariant over a desired range of depths, though blurry. On the depth ranging side, the PSF varies with range, and generates a shape (in this case a circle) which varies in size in a predictable manner with varying object depth.

While the exemplary preferred embodiments of the present invention are described herein with particularity, those skilled in the art will appreciate various changes, additions, and applications other than those specifically mentioned, which are within the spirit of this invention. For example, this technology can be broadened to include most other optical imaging systems—for example, for use in high-speed motion picture cameras for 3D movies in the entertainment industry.

What is claimed is:

1. The method of imaging a three-dimensional (3D) object that simultaneously accomplishes extended depth of field and 3D ranging, the method comprising the steps of:
   (a) providing an optical system including a waveplate, the waveplate constructed and arranged to modify the optical path of light from a 3D object such that optical system simultaneously produces an extended depth of field (EDF) image of the object and produces a depth-encoded image of the object having a point spread function (PSF) which varies according to range;
   (b) passing light from the 3D object through the optical system;
   (c) detecting the EDF image with a first detector and detecting the depth-encoded image with a second detector, the second detector spaced apart from the first detector;
   (d) digitally filtering the detected EDF image; and
   (e) producing a depth map from the detected encoded image.

2. The method of claim 1 further including the step of combining the filtered image and the depth map and forming a 3D representation of the 3D object.

3. The method of claim 1 wherein the step of detecting the EDF image is performed on one side of a best focus plane of the optical system and wherein the step of detecting the depth-encoded image is performed on the other side of the best focus plane.

4. The method of claim 3 further including the step of causing a discontinuity in the optical system point spread function (PSF) in the vicinity of the best focus plane with the waveplate.

5. The method of claim 1 wherein the step of producing the EDF image results in a modulation transfer function having no zeroes over a desired depth of focus.

6. The method of claim 1 wherein the step of filtering the EDF image deconvolves the EDF image.

7. The method of claim 6 wherein the step of deconvolving the EDF image is performed by a nonlinear neural network.

8. The method of claim 1 wherein the step of filtering the EDF image includes the steps of performing a pattern classification algorithm and separating the signal from the noise based on the pattern classification step.

9. The method of claim 8 wherein the waveplate is a circular caustic.

10. The method of claim 1 wherein the step of filtering the EDF image includes the step of performing a least squares fit of point sources to a two-dimensional Gaussian function.

11. The method of claim 10 wherein the waveplate is a circular caustic.

12. The method of claim 1 wherein the step of producing a depth map includes the step of performing a Hough transform on the encoded image.

13. The method of claim 12 wherein the step of performing a Hough transform performs a circular Hough transform.

14. The method of claim 1 wherein the waveplate forms a circular caustic shape.

15. A waveplate having at least one of either an optical element formed on a surface of the waveplate or an optical element formed b variation in index of refraction incorporated within the waveplate, which optical element, when the waveplate is placed in the path of an optical system, modifies the optical path of light from a 3D object so as to cause the optical system to simultaneously produce two spaced apart images comprising an extended depth of field (EDF) image of the object and a depth-encoded image of the object having a point spread function (PSF) which varies predictably according to range.

16. The waveplate of claim 15 formed in a circular caustic shape.

17. The waveplate of claim 15 formed as a transmissive element.

18. The waveplate of claim 15 formed as a reflective element.

19. The waveplate of claim 15 integrally formed with another optical element.

20. Apparatus for generating a 3D image of a 3D object comprising:
 a first detector and a second detector;
 an optical system including a waveplate disposed between the 3D object and the detectors;
 the waveplate constructed and arranged such that the optical system simultaneously produces an extended depth of field image at the first detector and a depth-encoded image at the second detector, wherein the depth-encoded image exhibits a PSF which maps depth location to various points within the 3D object.

21. The apparatus of claim 20 further comprising a processor constructed and arranged to filter the EDF image, form a depth map from the depth-encoded image, and combine the filtered image and depth map to form a 3D representation of the 3D object.

22. The apparatus of claim 21 wherein the processor includes a multiple layer, shift invariant neural network for nonlinearly deconvolving the EDF image.

23. The apparatus of claim 20 comprising a microscope wherein the optical elements include an objective for focusing light from the 3D object through the waveplate, and a beamsplitter for separating the EDF image and the depth-encoded image such that the EDF image forms on one side of a plane of best focus of the objective and the encoded image forms on the other side of the plane of best focus of the objective.

* * * * *